Sept. 30, 1941.  H. G. BROKERING  2,257,103

FLEXIBLE DEVICE

Filed June 2, 1938  2 Sheets-Sheet 1

INVENTOR
HARRY G. BROKERING
BY
ATTORNEYS

Sept. 30, 1941.   H. G. BROKERING   2,257,103
FLEXIBLE DEVICE
Filed June 2, 1938   2 Sheets-Sheet 2

INVENTOR
HARRY G. BROKERING
BY
ATTORNEYS

Patented Sept. 30, 1941

2,257,103

UNITED STATES PATENT OFFICE 2,257,103

FLEXIBLE DEVICE

Harry G. Brokering, Osborn, Ohio

Application June 2, 1938, Serial No. 211,405

7 Claims. (Cl. 244—118)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a removably mounted flexible member adapted for use as duo-functional seats and closures and the like and more particularly as used in aviation.

An object of this invention is to provide a seat, such as a chair or the like, with a flexible back and seat portion that may be removed from its position.

Another object of this invention is to provide supporting means for a flexible seat or the like.

Another object of this invention is to provide a removable wall having a contour such that one side thereof may be used as a chair or a seat, removably mounted so as to clear the space.

Another object of this invention is to provide an articulated wall in an airplane made from a plurality of parallel slat-like members.

Another object of this invention is to provide a passage extending in aligned relation with respect to the articulated seat portion in which passage the seat portion may be projected.

Another object of this invention is to provide an articulated wall portion for an airplane, which wall portion may be removed so as to leave an open space vacated by the wall portion.

Another object of this invention is to provide a seat having a seat and back rest made from an articulated member that may be rolled so as to clear the space occupied by the seat.

Other objects and advantages reside in the construction of parts, the combination thereof and the mode of operation, as will become more apparent from the following description.

Figure 7:
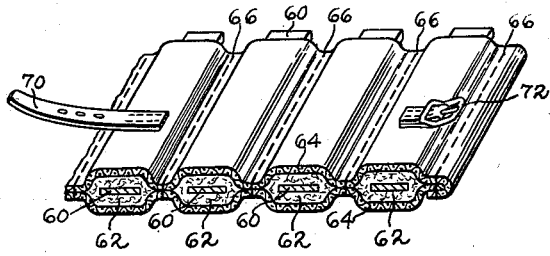

Fig. 7 disclose a cross sectional view of an articulated seat member padded with kapok, so as to adapt it for use as a life preserver.

Figure 8:
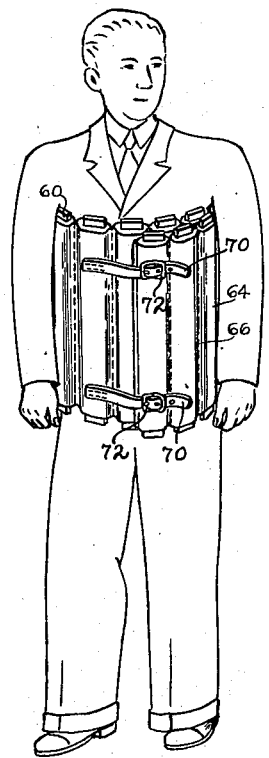

Fig. 8 discloses the embodiment disclosed in Fig. 7 utilized as a life preserver.

Figure 9:
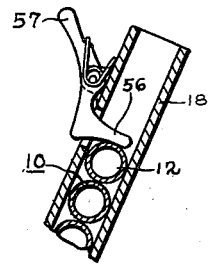

Fig. 9 is a view partly in section of the latch device.

In airplanes and elsewhere space is oftentimes at a premium. In airplanes it is very desirable to utilize all the room as economically as possible. The space in the cockpit is very limited, due to the necessity for mounting a great number of instruments therein. The room left vacant for the pilot is barely sufficient to accommodate him. Instruments are at times mounted under the seat. It is very inconvenient to repair and do any other work on the instruments mounted in the cockpit due to the limited space. At times the seat is removed from the airplane in its entirety, to permit the repairman to carry on his work.

By using an articulated seat and back rest portion for the chair or seat in the cockpit that is slidable out of position, the seat and back rest have a duo-functional purpose, in that the articulated member in addition to functioning as a seat, functions as a removable partition between the cockpit and the cabin of the airplane.

The passenger seats in the cabin may also be provided with an articulated seat and back rest removably mounted, so as to make the space vacated by the seat and back rest portion available for other purposes when the seat and back rests are removed. The articulated member, in addition to being used for seats in airplanes, may also be used as closures for openings in the wall of the airplane. It may be used as a door for the purpose of bailing out in case of accident. When pivotally mounted doors are used for this purpose they generally swing outwardly, as the space within the cabin is used for other purposes, thereby preventing the doors from swinging inwardly. When swinging outwardly, especially when the plane is traveling at a high speed, the door slams against the side of the cabin, oftentimes injuring the wall and at times breaking the hinges or breaking the door mounting. By using the articluated member as a closure, it may be rolled along the top of the plane where the room is not so valuable.

In bombers and other aircraft used for war purposes, an articulated member may be used as a part of the floor or the bottom, it merely being necessary to slide the articulated member so as to provide a clearance for dropping the bombs, et cetera.

The use of an articulated member is not confined to airplanes. It may be used in porch furniture, furniture for lobbies, furniture for trains and on board ships. When used on board ships, the articulated member may be a duo-functional member, if the padding consists of kapok or any other suitable material used in life preservers. It is then merely necessary to remove the seat and back rest of the chair, strap this around the body and use it as a life preserver. The above uses are merely enumerated for the purpose of illustration, not as limitations. Detailed description of my device follows.

Figure 1:
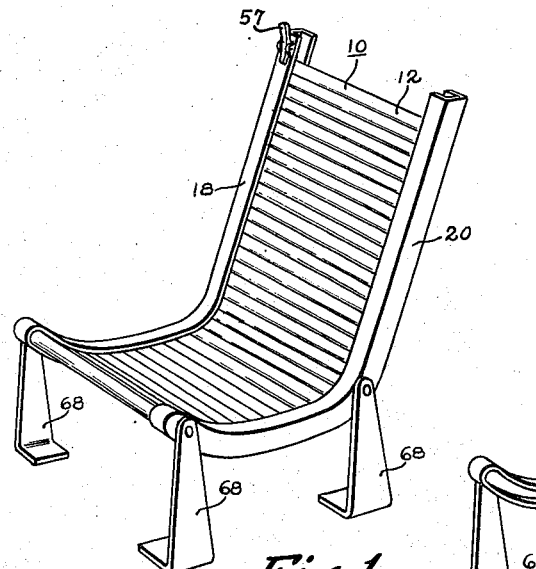
Fig. 1 is a perspective view of a seat made from an articulated seat and back rest.
Figure 2:
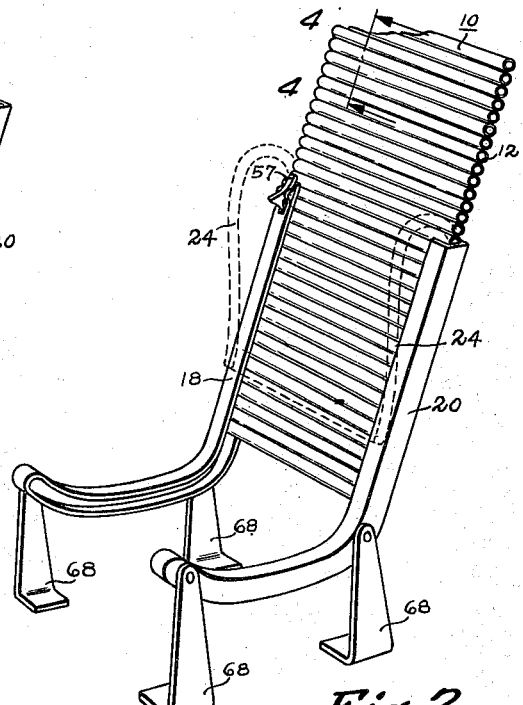
Fig. 2 is a perspective view similar to that shown in Fig. 1, with the seat portion and back rest partially withdrawn.
Figure 3:
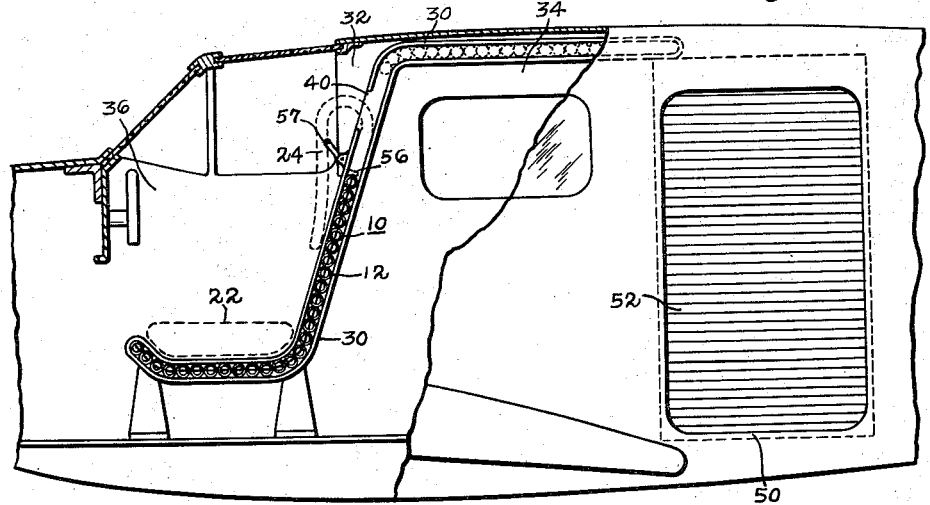
Fig. 3 shows a fragmentary view of the cockpit and a portion of the cabin of an airplane, with parts broken away to show utilization of the device as incorporated in an airplane.
Figure 4:
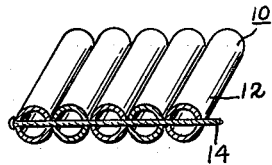
Fig. 4 is a fragmentary sectional view taken substantially on the line 4—4 of Fig. 2.

In the drawings the reference character 10 indicates an articulated member which may be made from a plurality of slat-like or tubular members 12, as best seen in Fig. 4, held together by a suitable rope, cord or cable 14, threaded through registering apertures in members 12. As may best be seen by referring to Figs. 1 and 2, the seat and back rest member 10 is mounted in a pair of channels 18 and 20, having the channels facing each other, formed so that the articulated member 10 mounted in the channels may be used as a seat. By referring to Figs. 1, 2 and 3 it is seen that the bottom of the seat is concave. In aircraft it is common practice to use a parachute 22, shown by dotted lines in Fig. 3, as a cushion. If it is found necessary for any reason whatsoever to remove the seat and the back rest from the chair, this may be accomplished by retracting the seat and back rest in the direction shown in Fig. 2. It may be left in a hanging position following the dotted lines 24 shown in this figure, making the space vacated by the seat portion available for other use. For example, by raising the seat and back rest in the modification disclosed in Fig. 3, instruments underlying the seat are then made available. In this modification the channels 30, only one of which has been shown, are mounted on the side 32 of the cabin of the airplane. The channel 30 extends rearwardly on the top of the cabin, so that the entire seat and back rest may be pushed into a position along the ceiling of the cabin, so as to provide a door between the cabin 34 and the cockpit 36. Parts of the airplane have been shown schematically, as these parts have been shown merely for the purpose of illustration. Channel members 30 are provided with a cut-away portion 40, permitting the seat and back rest to be withdrawn or removed from the airplane in its entirety. It may be removed for the purpose of cleaning, repairing, refinishing or to make the space available for other purposes, especially for repair of the airplane.

In the modification disclosed in Fig. 3, the cabin of the airplane has been provided with a side door 50, which has been shown in the side for the purpose of illustration. Instead of a conventional hinged door, the door opening has been closed by an articulated member 52, similar to that disclosed in the foregoing modification.

Figure 6:
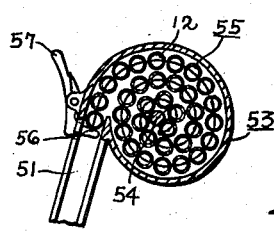
Fig. 6 shows another modification wherein the articulated member is wound into a roll when not in use.

Referring to Fig. 6, the channels 51, similar to channels 18 and 20, or 30 as the case may be, terminate in a cylindrical tube-like member 53 provided with a roll 54 journalled in the ends of the cylindrical member 53. The flexible member 55 has one end fixedly secured to the roll 54 adapted for rotation therewith, so that as the roll 54 is rotated, either manually or by a spring, the flexible member is rolled into a roll when it is retracted from the chair. If a spring is used a dog 56 engages the spaces between the slat-like members 12, so as to prevent the spring from withdrawing the flexible member 55 from operative position. When it is found desirable to roll the flexible member it is merely necessary to press on the release end 57 to release the flexible member. The dog 56 is preferably biased in a counterclockwise direction, as viewed in Fig. 6, by a suitable spring, so as to cause the dog to engage the adjacent slat or slat-like member 12 to prevent withdrawal of the extended portion of the flexible member.

Referring to Fig. 7, slats 60, comparatively light in weight, extend through padding 62, such as kapok or other suitable buoyant but non-absorbent material, held in position by upholstering material 64, such as canvas or the like. The upholstering material 64 is stitched or sewed at 66 by a seam extending parallel to the slats 60 and throughout the length of the padding, so as to hold the assembly in fixed relation, but in flexible relation. This assembly may be used with the channels 18 and 20 shown in Figs. 1 and 2, which channels supported upon the upright 68 may be secured to the deck of a ship. In the event of an emergency, the padded kapok assembly may be removed from the chair and used as a life-preserver, in that kapok has the property of floating in water for a long period of time without becoming saturated. This assembly has been shown used as a life-preserver in Fig. 8, where the life-preserver has been wrapped about the body of a person and held in position by a strap 70 threaded through a buckle 72. Any suitable arrangement for holding the life-preserver in position may be used. The slats 60 may be attached to the assembly by rivets, not shown, or for some purposes the slats 60 may be left loose so that as the life-preserver is placed in position the slats drop out, or may be slidably removed, for the comfort of the wearer.

Figure 5:
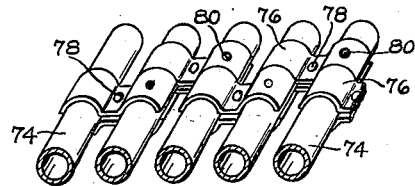
Fig. 5 is a modification.

In the modification disclosed in Fig. 5, the tubular slat-like members 74 are held in fixed spaced relation relative to each other by pairs of links 76 riveted or bolted together at 78, the adjacent pairs of links being staggered so as to form two rows of links on each side of the articulated or flexible member, one of which rows may be referred to as the outer row and the other as the inner. There are preferably two rows of links on each side of the articulated member. Suitable pins, rivets, bolts or spot welds indicated at 80 may secure one end of each pair of links 76 to a tubular member. By arranging corresponding pairs on opposite ends of member 74, both on the outside or both on the inside as the case may be, the fastening device 80, cooperating with the links 76, prevents longitudinal or endwise movement of member 74, but permits flexibility, as one end of each pair of links is rotatably mounted upon the tubular member 74.

Although the preferred modification of the device has been described, it will be understood that within the purview of this invention various changes may be made in the form, details, proportion and arrangement of parts which generally stated consist in a device capable of carrying out the objects set forth, in the novel parts, combination of parts and mode of operation, as disclosed and defined in the appended claims.

Having thus described my invention, I claim:

1. A seat and partition assembly disposed between the cockpit and the cabin of an airplane, said assembly including a pair of oppositely disposed curved channel members mounted upon the walls of the cockpit, a longitudinally flexible but transversely rigid member adjustably mounted in said channels so that when the flexible member is in one position it functions as a partition between the cockpit and the cabin of the airplane and as a seat for the pilot and when in another position the flexible member being vacated from the seat position in the channels leaving an opening between the cockpit and the cabin.

2. A seat and partition assembly disposed between the cockpit and the cabin of an airplane, said assembly including guide means having a pair of curved paths corresponding to the general contour of the seat portion and back rest portion of the seat assembly, said guide means being disposed intermediate the cabin and the cockpit, and a longitudinally flexible but transversely rigid member adjustably mounted in said guide means so that when the flexible member is in one position it functions as a partition between the cockpit and the cabin of the airplane and as a seat for the pilot, and when adjusted to another position vacates the seat position leaving an opening between the cockpit and the cabin.

3. A pilot seat and back rest assembly disposed intermediate the cabin and the cockpit of an airplane, said seat assembly including a pair of channels one on either side of the outer wall of the body of the airplane and opening toward each other, said channels having a contour corresponding to the contour of the seat and back rest and having rearwardly extending portions extending from the top of the back rest portion and underlying the ceiling of the cabin, and an articulated member comparatively rigid in a transverse direction but flexible longitudinally adjustably mounted in said channels so that when in one position the flexible member functions as a partition between the cabin and the cockpit and as a seat for the pilot, and when in another position underlying the ceiling of the cabin vacating the space between the cabin and the cockpit so as to open these into one room.

4. A seat and back rest assembly including a pair of channels disposed on opposite sides and in opposite directions, the channels opening toward each other and having a curved path corresponding to the general contour of the seat portion and back rest portion of the seat assembly, said channels extending beyond the seat portion and the back rest portion, said channels having an opening in one side of each, and a flexible member movably mounted in said channels, said flexible member being substantially rigid in a transverse direction but articulated in a longitudinal direction so as to permit easy movement thereof in the channels throughout the curved path and at the same time having sufficient transverse rigidity to support the occupant of the seat assembly, said flexible member being removable from the channels through the opening in the sides thereof.

5. A chair assembly having a seat portion and a back rest portion, said assembly including a pair of parallel channel members disposed on opposite sides of the chair and in opposite directions, the channels opening toward each other and having a curved path corresponding to a general contour suitable for the seat portion and the back rest portion of the chair, and flexible means mounted in said channels, said channel members being so constructed as to permit ready removal of the flexible member, said flexible means being substantially rigid in a transverse direction to support the occupant of the chair but flexible longitudinally so as to permit easy movement of the flexible means in the channels, said flexible means being buoyant and including padding material and transversely disposed slat-like members embedded in the padding material, the slat-like members giving rigidity, the padding material cushioning the chair and adding buoyancy whereby the slatted member may be used as a life-preserver.

6. A chair assembly having a seat portion and a back rest portion, said assembly including guide means disposed on opposite sides of the chair and forming a curved path corresponding to the general contour of the seat portion and back rest portion of the chair, a duo-functional flexible seat and back rest portion and life-preserver member, said member including a plurality of transversely disposed slat-like members, kapok surrounding said slat-like members forming a padding functioning as a cushion when said duo-functional member is used as a seat and back rest portion in the chair assembly and functioning as a buoyant material when said duo-functional member is used as a life-preserver, and means for securing the flexible member in position when used as a life-preserver.

7. A seat and partition assembly disposed between the cockpit and the cabin of an airplane, said seat having a seat portion and a back rest portion, said assembly including a pair of guide members having a curvature corresponding to the general contour of the seat portion and back rest portion of the seat assembly, said guide members being disposed intermediate the cockpit and the cabin, and flexible means suspended between the guide means so as to function as a seat portion and a back rest portion and simultaneously as a partition between the cockpit and the cabin, said flexible means being adjustable upon the guide means so as to permit adjustment thereof to vacate the space between the cockpit and the cabin.

HARRY G. BROKERING.